United States Patent [19]
Gates

[11] Patent Number: 4,784,184
[45] Date of Patent: Nov. 15, 1988

[54] ELASTIC DRIP SILENCER AND FUNNEL

[75] Inventor: Christopher G. Gates, Chittenango, N.Y.

[73] Assignee: Practique, Inc., Chittenango, N.Y.

[21] Appl. No.: 91,836

[22] Filed: Sep. 1, 1987

[51] Int. Cl.$^4$ .............. F16L 11/12; B67C 11/00
[52] U.S. Cl. .................. 138/109; 141/337; 181/233; 285/8
[58] Field of Search .......... 141/337; 285/8; 4/252 A; 138/109; 181/233

[56] References Cited

U.S. PATENT DOCUMENTS

| | | | |
|---|---|---|---|
| 135,391 | 1/1873 | Way | 141/337 |
| 1,110,959 | 9/1914 | Niewiardowski | 285/8 |
| 1,661,704 | 3/1928 | Osborne | 181/233 X |
| 1,773,643 | 8/1930 | Romanchak | 285/8 X |
| 2,924,253 | 2/1960 | Beddow | 141/337 X |
| 4,633,899 | 1/1987 | Lord | 141/337 X |

*Primary Examiner*—Mark J. Thronson
*Attorney, Agent, or Firm*—Marmorek Guttman & Rubenstein

[57] ABSTRACT

An elastic hose for conducting a liquid from a source such as a water fixture or a storage container to a delivery site is disclosed. The hose includes an upper funnel-shaped portion and at least one contiguous lower cylindrically-shaped portion. The upper portion may be stretched over a water fixture, a liquid container, or the like to form a gripping leak-proof seal. The hose has a stretchability of about 400%–1,000%. The lower portion is led to a delivery site. The hose is able to conduct liquid from a source to the delivery site without spills or mess. Moreover, in the case of a leaky faucet, the hose eliminates splashing and substantially decreases the noise generated by the leaking water.

19 Claims, 2 Drawing Sheets

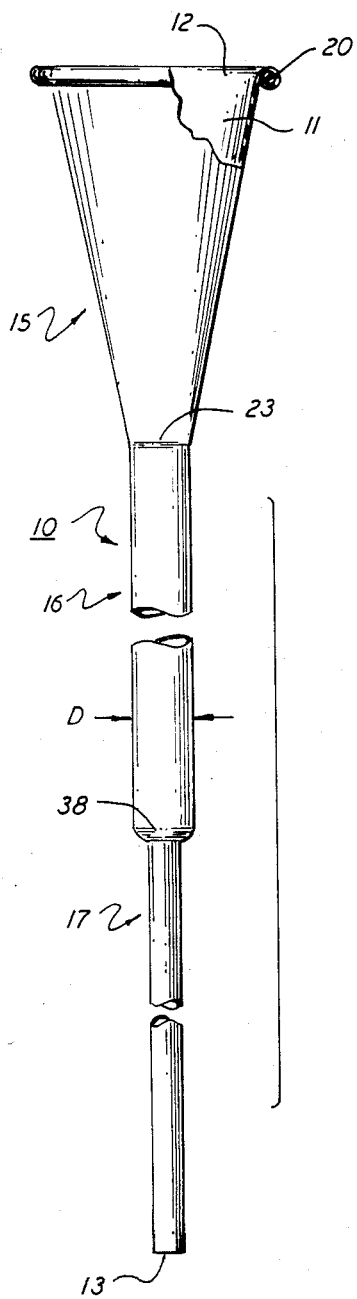
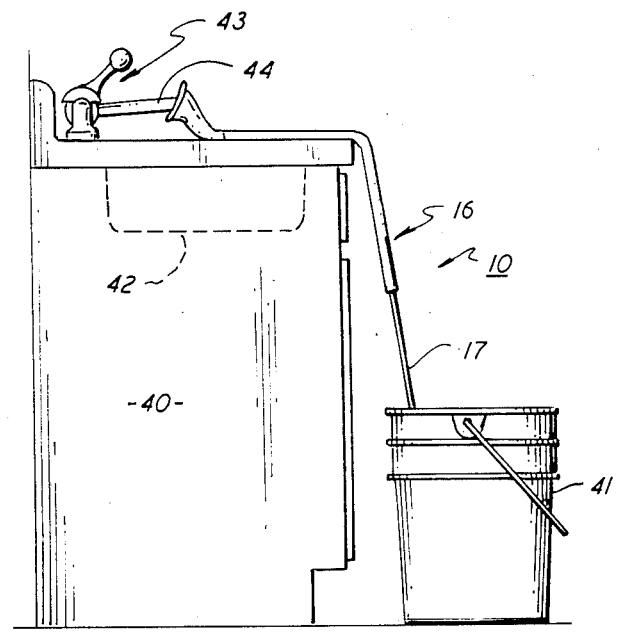
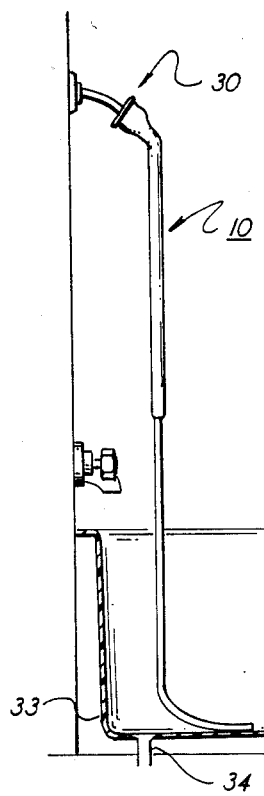
FIG. 1
FIG. 2
FIG. 3

ELASTIC DRIP SILENCER AND FUNNEL

FIELD OF THE INVENTION

This invention relates to an elastic hose that can be snapped onto different sized or shaped faucets, spigots, and showerheads to provide a leak-proof joint therewith, or which can be used as a flexible funnel for a variety of uses.

More specifically, in one embodiment, this invention relates to an elongated elastic hose that can be easily adapted to fit over any size or shape domestic water outlet to substantially silence a leaking fixture or to conduct water from the fixture to a pail or the like which will not fit under the outlet and could therefore not otherwise be filled.

In another embodiment of the invention, the elongated elastic hose is adapted for use as a flexible funnel which can be stretched over different sized or shaped cans and which is easily stored.

BACKGROUND OF THE INVENTION

A common problem which plagues homeowners, apartment dwellers, and the like is a leaky faucet. In addition to the incessant and annoying dripping sound which inevitably accompanies the same, it is often the case that the splash made by the droplets of water dampen or flood the surrounding area. This may result in ruined carpets, floors, and possibly soaking of the ceiling below.

It is often the case in such situations that the proper tools for fixing a leaky faucet are not readily available. Even if these tools were available, in many cases the individual is not mechanically inclined or doesn't have the necessary know-how to fix a leaky faucet. Usually, the faucet leaks until the problem becomes severe enough that a plumber is called. Until the plumber arrives, however, the noise and the mess remain.

There are times during a water shortage, for example, when a homemaker might want to make use of the water leaking from a leaking faucet to water a pet or plants or clean the floor. But, ordinarily, when the droplets are caught in a receptacle, such as a bucket, the droplets make such an irritating noise when they hit the bottom of the bucket, that it is often better to let the leaking water go down the drain.

In addition, there are times when a housewife would like to fill a pail with water from a nearby sink, but finds that the pail will not fit under the faucet. Therefore, she is forced to seek water at a more distant source and must transport a filled container over a considerable distance. This can be extremely tiring where the distance is long and the load heavy. By the same token, transporting a heavy pail of water invariably leads to some water spilling from the pail and causing water damage.

Various attachments for use in conjunction with water outlets are known, the purpose of the majority of them being to permit a sink or bathtub to be filled with water in such a manner that the usual noise associated with running water is virtually eliminated.

For instance, U.S. Pat. No. 1,663,382 discloses a device to silence flowing water from a water outlet which comprises a spirally wound member preferably made of soft fabric which is secured by a collar onto a faucet. In addition to quieting the flow of water, this device also functions to filter the same.

Similarly, U.S. Pat. No. 2,794,200 discloses a shower spray absorber which includes a soft tube of cloth attached to the shower head by a collar so that the spray flow when the shower is turned on may be conducted within the tube.

In U.S. Pat. No. 1,661,704, a water silencer is provided for use when a faucet is turned on which is attached to the faucet without the use of fittings. It comprises a substantially elliptical rubber tube which has an enlarged lower end at the discharge point. At the discharge point, the device is flattened and provided with notches to break up the stream of water.

A device for reducing the sound which occurs when liquid under high pressure flows out of a faucet is disclosed in U.S. Pat. No. 2,194,163. It includes a tubular inner body closed at its lower end with numerous transverse perforations and a concentrically arranged outer tube. By diverting the direction of flow through the perforations and downward, a loss in hydro-static pressure is accomplished, thus making the flow quieter.

All of the above-mentioned devices are directed at silencing or controlling the flow of a stream of water when the faucet is in the open position. Other prior art devices, such as those disclosed in U.S. Pat. Nos. 1,110,959; 1,383,886 and 1,783,492 also address the control of flow of water from an open faucet. These devices fail to provide a solution for the situation which arises when the faucet is shut off and leaks. Moreover, the elasticity of these devices is quite limited. The stretchability of all of these prior art devices is less than 100%, thus they are limited to fit outlets near their original size and shape.

It is therefore an object of the present invention to provide a device which controls the flow of water from a leaky faucet by a simple and inexpensive means.

It is another object of the present invention to provide a device which minimizes the amount of noise which accompanies a leaky faucet.

It is also another object of the present invention to provide a device which makes it tolerable to save some of the water from a leaking facuet so that it can be used.

It is further object of the present invention to provide an elastic hose that is adaptable to establish a gripping, leak-proof connection to a liquid source regardless of its size or shape in order to conduct liquid away from the source without the need for additional parts, such as a collar.

It is a further object of the present invention to provide a device which is elastic and can thereby be extended and adjusted in length to reach an outlet, such as a bucket, etc., in order to collect the water.

It is a further object of the present invention to provide a simple and inexpensive hose that can be connected temporarily to different sized and shaped water faucets to either silence a drip or to divert water into a suitable container.

Another object of the present invention is to provide a flexible hose for temporary use in association with a domestic water outlet which can be folded into a small package and easily stored when not in use.

It is yet another object of the present invention to provide a device which, with simple modifications, can be used for a variety of other functions, for example, as a funnel.

SUMMARY OF THE INVENTION

These and other objects of the present invention are attained by a drainage hose formed of an elastic tube having a central passageway for conducting a liquid away from a source such as a water outlet or tap. The tube is made in three sections which include a funnel shaped upper section, a cylindrical middle section and a smaller cylindrical lower section. The drainage hose is provided with enough flexibility to allow it to be folded into a small package when not in use. The upper opening of the funnel shaped section is wide enough to permit this section to be stretched over a faucet or the like to establish a leak-proof connection therewith. The hose may also be cut through the middle or lower sections to vary the length of the tube, so that water dripping from the faucet may be conducted directly into the drain or to a bucket, etc. Preferably, the hose is made from a thin, balloon-like, latex material, having a stretchability on the order of about 400%-1,000%, and most preferably, about 700%-900%.

The hose is therefore an excellent temporary solution for the problem of controlling the splashing and noise generated from a leaky faucet and the like.

In another embodiment of the present invention, the drainage hose may be adapted for use as a funnel. This is accomplished by using a petroleum resistant, less elastic material and providing a wider mouth and upper portion. In this case, the hose has a stretchability on the order of about 400%-600%. Preferably, this embodiment is a shorter version of the drainage hose described above, but is similar in that it also may be folded into a small package and easily stored when not in use. While flexible funnels have been described in the past, see, e.g., U.S. Pat. No. 135,391, funnels which can be folded into a small package are not previously known.

The funnel described above may be used in situations where it is unlikely that a regular funnel is handy. For instance, it is highly unlikely that an automobile is equipped with a funnel due to its awkward shape and the space it takes up. However, the present funnel may be folded up and stored in a very small area, such as the glove compartment of an automobile. This provides the driver of the automobile with a practical solution to the problems which arise when it is necessary to add oil or antifreeze to the engine. Especially in an emergency situation, it is highly unlikely that a funnel will be handy. The present invention solves this problem by making it practical to have a funnel handy at all times.

Another important feature of the funnel according to the present invention is the fact it may be easily discarded after a single use. After a funnel is used once for a viscous liquid such as oil, it becomes extremely messy. For this reason, it is even less desireable for the average motorist to store a funnel in his car, especially after it has been used. On the other hand, the funnels available to motorists in the past have generally been too expensive for the great majority of motorists to discard after a single use. However, because of the relatively small cost of the present funnel, it is no longer inefficient to discard the same after a single use. In addition, due to the funnel's elasticity, it may be re-folded and stored in the pouch that it was sold in until it can be cleaned up and stored again or conveniently discarded (such as the case when no trash receptacles are readily available).

BRIEF DESCRIPTION OF THE DRAWINGS

FIG. 1 is a side elevational view of an elastic drainage hose that embodies the teachings of the present invention;

FIG. 2 is a side elevational view of a sink showing the drainage hose shown in FIG. 1 being used to fill a container from the sink tap;

FIG. 3 is a side elevational view in partial section of a bathtub showing the drainage hose in FIG. 1 being used to drain water from a leaking shower head to a drain situated at the bottom of the tub;

DETAILED DESCRIPTION OF THE INVENTION

Figure 4:
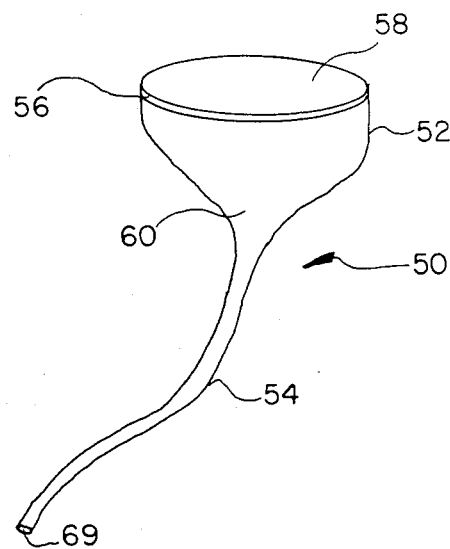
FIG. 4 is a side elevational view of a funnel according to the present invention.

Turning now to the drawings and, in particular, to FIG. 1, an elastic drainage hose is formed from a single piece of thin latex and is capable of being considerably stretched in all directions without breaking or tearing. The hose has a stretchability on the order of about 400%-1,000%, and preferably about 700%-800%. The hose is tubular shaped throughout and has a circular passageway 11 extending from a top opening 12 to a bottom opening 13 through which any type of liquid can be conducted.

The drainage hose of the present invention is comprised of three contiguous coaxially aligned sections including a funnel shaped upper section 15 which is joined to a cylindrical middle section 16 which, in turn, is joined to a smaller cylindrical lower section 17. Upper section 15 includes a rolled top which makes a reinforced elastic ring 20 which surrounds the opening 12. The wall 21 of the funnel is brought inside the ring.

By stretching the material forming the upper section of the funnel wall 21 and letting it contract around the faucet above the point of drippage, it is possible to vary the size and shape of the top opening. The drainage hose is thus provided with additional adaptability for its attachment to a water fixture, such as a faucet. In this way, the size of the top opening can be varied so that it can be exactly matched to the size of the water fixture so that many different-sized fixtures can be accommodated by a single-sized hose. In other words, "one size fits all".

The funnel of FIG. 1, in an unstretched condition, is about three inches long and has a two inch (seven inch maximum when stretched) top diameter when measured inside the ring. The side wall of the funnel tapers uniformly downwardly toward the middle section of the tube and terminates at the entrance 23 to the middle tube section which is about ½ inch in diameter.

By configuring the upper section of the tube in the manner described above, the top of the rubber hose can be conveniently stretched over all faucets, shower heads, etc., that are presently used in the home. The latex balloon-like construction provides sufficient elasticity so that when the funnel is released from a stretched position about the shower head it will contract into conforming contact against the fixture to establish a gripping and leak tight seal. In the event the outlet is smaller than the top opening, the funnel is engaged with the outlet so that the outlet is gripped by the deeper, smaller part of the funnel that will effectively accommodate the outlet.

As previously noted, the middle section of the hose is cylindrical in form and has a diameter of about ½ inch, and is preferably about 30 inches long. The middle section is connected to the top of the lower section at a necked down joint 38. The lower section is also cylindrical in form having a diameter of about ¼ inch and a length of about 30 inches. The overall length of the hose therefore, is over 60 inches which provides more than adequate length so that it can be used for the noted purpose.

The drainage hose of the present invention can also be used as shown in FIG. 2 to convey water from a sink tap 40 into a large container, such as water pail 41 which ordinarily cannot be placed inside a shallow basin 42 beneath the sink faucet 43.

In this type of application, where the faucet outlet is not very wide and the vertical distance to the pail relatively short, the tube can be cut across the upper part of the middle section 16 and the severed part of the tube discarded. This provides the tube with a small ½ inch top opening that can be stretch fitted over a small tap to establish a gripping tight connection around the tap. The body of the tube is brought over the rim of the sink and is passed downwardly into the pail. For a hose of the size herein described, a relatively high continuous volume rate of flow can be sustained so that the container is filled in a short period of time. The hose can also be used to fill large containers from small units thereby eliminating the need of having to carry heavy buckets over relatively long distances. Once used, the present device can be easily disconnected from the fixture and stored in a small package until such time as it might be needed again. The hose can, of course, be used in the same manner described in association with FIG. 3 to also collect water from a leaking faucet or shower so that the water can be put to use and thus not wasted.

As should be evident from the disclosure above, the single piece elastic hose of the present invention can be easily stored about a house or apartment so that it will be readily available when an emergency arises. The hose is also adaptable to fit different size and shape outlets such as sink and tub taps or shower heads of all types. The hose efficiently and virtually silently conducts drops from a leaking faucet into an existing drain or into a storage container. It is specifically designed and fitted to control leakage from faucets that are shut off but persist in leaking.

FIG. 3 illustrates the drainage hose of the present invention being used to silence a leaking shower head 34. The head is shown mounted immediately over the drain end 33 of a conventional bathtub 32. As can be seen, water dripping from the head will fall considerable distance before striking the bottom of the tub. As a consequence, the drops hitting the tub produce considerable noise which is extremely annoying. In some cases, the falling droplets can splash over the rim of the tub and thus cause water damage if allowed to continue unabated. As illustrated, the drainage hose 10 is stretched over the shower head 34 and the body of the tube is allowed to hang dow inside the tub. The tube is provided with sufficient body length so that the lower section 17 thereof can be seated upon the floor of the tub with the bottom opening 13 of the tube lying adjacent the tub drain 34. As can be seen, water dripping from the head is conducted quietly down the inside wall of the tube and is passed directly into the drain without splashing or otherwise wetting the surrounding surfaces. The hose can thus be used temporarily to silence annoying and troublesome drips until such time as a plumber is available to repair the leaking fixture. The flexible tube, after being removed from the fixture, can be hung on a hook or folded into a small package and stored until it is again needed.

FIG. 4 illustrates another embodiment of the present invention in which the hose has been adapted to act as a funnel 50. In order to accomplish this result, a number of adjustments are made to the hose. For instance, funnel 50 has a wider mouth than the hose depicted in FIGS. 1–3 because it is made from a petroleum resistant, less elastic material. Moreover, it is made from a less elastic material. The stretchability of funnel 50 is on the order of 400%–600%. Finally, in a preferred embodiment, the funnel 50 is shorter than the hose depicted in FIGS. 1–3 in order to allow the more direct transfer of the liquid from the source to the deposit site.

Funnel 50 is basically comprised of two contiguous coaxially aligned sections including a funnel-shaped upper portion 52 which is joined to a cylindrical lower portion 54. The upper portion 52 of funnel 50 is about 2½ inches in diameter, while the lower portion 54 is only about ½ inch in diameter. The entire funnel 50 is about 12 inches long. Similar to the embodiment of the present invention depicted in FIGS. 1–3, the upper portion 52 includes a rolled top which makes a reinforced elastic ring 56, which surrounds the top opening 58, the upper portion of the funnel wall 60 being attached to ring 56 by any suitable means.

Figure 5:
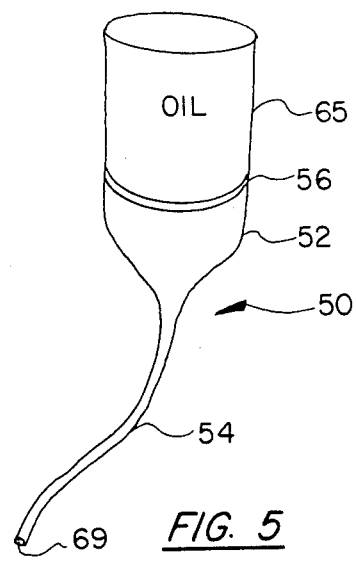
FIG. 5 is a side elevational view showing the funnel in FIG. 4 being used to transfer the contents of an oil can.

The ring 56 prevents tearing and provides a handle by which the device can be installed, as well as an extra tight grip, so it is less likely to slip when it is used o large containers. Alternatively, it forms a shaped border which can accommodate a variety of liquid dispensers such as the oil can 65 depicted in FIG. 5. The lower opening 69 of funnel 50 can easily be placed into a vessel for receiving the liquid to be transported. For instance, the lower opening 65 can easily be placed within the appropriate opening of an engine block (not shown) in order to convey oil from the oil can 65 into the engine block.

Once again, it is possible to vary the size of the top of funnel 50 by stretch fitting its upper section 52 in order to accommodate different sized containers. Thus, similar to the drainage hose depicted in FIGS. 1–3, "one size fits all". Funnel 50 can be made on the same equipment as the drainage hose depicted in FIGS. 1–3.

While the invention has been described in detail with reference to preferred embodiments, it should be understood that the invention is not limited to those embodiments, and that many modifications and variations will present themselves to those of skill in the art without departing from the scope and spirit of this invention, as defined in the appended claims.

What is claimed is:

1. An elastic hose for conducting liquids from a source of the liquid to a delivery site, comprising
   an elongated tubular member made from a thin-walled elastic material, said tubular member having a central passage for conducting a liquid, said tubular member including
   an upper funnel-shaped portion having a top opening, said top opening being stretchable over a source of liquid to form a gripping leak-proof seal,
   a cylindrically-shaped lower portion below said upper portion, said lower portion having a smaller diameter than said upper portion,
   said tubular member having a stretchability in the range of about 400%–1,000%,
   said tubular member being easily cuttable so that its length can be adjusted.

2. The hose of claim 1, wherein said upper portion includes an elastic ring near said top opening.

3. The hose of claim 2 wherein said hose has a stretchability of about 400%–600%.

4. The hose of claim 1 wherein said hose has a stretchability of about 700%–900%.

5. The hose of claim 1 further comprising a cylindrically-shaped middle portion between the upper and lower portions, said middle portion having a larger diameter than said lower portion.

6. The hose of claim 5, wherein the diameter of said top opening in the upper section of the tubular member is about four times larger than the diameter of the middle section.

7. The hose of claim 6, wherein the diameter of the lower portion of said tubular member is about one-half the diameter of the middle portion.

8. The elastic hose of claim 7 wherein the diameter of the middle portion is about one-half inch.

9. The hose of claim 5, wherein said middle and said lower portions have an axial length, the axial length of said middle portion being approximately equal to the axial length of said lower portion.

10. The hose of claim 9, wherein said middle and lower portions of said tubular member are each about 30 inches long.

11. The hose of claim 10, wherein said axial length of said upper portion is about three inches long and tapers uniformly toward said middle portion.

12. The hose of claim 3, wherein said tubular member is made from a single piece of thin petroleum resistant material, said material being stretchable in all directions without tearing.

13. The hose of claim 3, wherein said tubular member is adapted to fit over a water fixture, said water fixture being operable between an open position and a closed position, said tubular member being adapted to conduct water that leaks out of said water fixture to said delivery site when said water fixture is in said closed postition, said tubular member being adapted to substantially decrease noise generated by the leaking water.

14. The hose of claim 3 wherein said tubular member is adapted to fit over a liquid storage container.

15. The hose of claim 12, wherein said tubular member is foldable into a small package and easily stored when not in use.

16. The hose of claim 1, wherein said tubular member is made from a latex material.

17. An elastic hose for conducting liquids from a source of the liquid to a delivery site, comprising
an elongated tubular member made from a thin-walled elastic material, said tubular member having a central passage for conducting a liquid, said tubular member having a stretchability of about 400%–1,000%, said tubular member including
an upper funnel-shaped portion having a top opening, said top opening being stretchable over a source of liquid to form a gripping leak-proof seal,
a cylindrically-shaped middle portion contiguous with and below said upper portion, said middle portion having a diameter less than the diameter of said top opening, and
a cylindrically-shaped lower portion contiguous with and below said middle portion, said lower portion having a diameter smaller than said middle portion.

18. The hose of claim 17 wherein the diameter of said top opening in the upper section of said tubular member is about four times larger than the diameter of said middle section.

19. The hose of claim 18, wherein the diameter of said lower portion is about one-half the diameter of said middle portion.

* * * * *